United States Patent
Shaffer et al.

(10) Patent No.: US 7,140,397 B2
(45) Date of Patent: Nov. 28, 2006

(54) DUCT INSULATION HAVING CONDENSATE WICKING

(75) Inventors: Roy Shaffer, Granville, OH (US); Charles W. Crim, Jr., Lakeville, MN (US); Manoj K. Choudhary, Reynoldsburg, OH (US); Steven F. Geiger, Johnstown, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 442 days.

(21) Appl. No.: 10/699,538

(22) Filed: Oct. 31, 2003

(65) Prior Publication Data

US 2004/0238059 A1  Dec. 2, 2004

Related U.S. Application Data

(63) Continuation-in-part of application No. 10/448,757, filed on May 30, 2003, now Pat. No. 6,814,105.

(51) Int. Cl.
*F16L 9/14* (2006.01)

(52) U.S. Cl. ............... 138/149; 138/151; 138/152; 138/156; 428/36.9; 428/99

(58) Field of Classification Search ............ 138/149, 138/151, 152, 156, 167, 110; 428/36.9, 99, 428/36.1; 156/310, 215
See application file for complete search history.

(56) References Cited

U.S. PATENT DOCUMENTS

| | | | |
|---|---|---|---|
| 4,946,732 A | 8/1990 | Cohen et al. ............... 428/192 |
| 5,325,893 A | 7/1994 | Takagi et al. ............... 138/143 |
| 5,441,083 A | 8/1995 | Korsgaard ................... 138/149 |
| 5,690,147 A | 11/1997 | Cridland et al. ............. 138/149 |
| 5,750,225 A | 5/1998 | Petty ......................... 428/26.2 |
| 5,848,509 A | 12/1998 | Knapp et al. ............... 52/406.2 |
| 6,026,863 A * | 2/2000 | Korsgaard ................... 138/149 |
| 6,231,704 B1 | 5/2001 | Carpinetti ............... 138/149 X |
| 6,444,289 B1 | 9/2002 | Ernest .................... 138/149 X |
| 6,635,322 B1 * | 10/2003 | Korsgaard ................. 428/34.5 |
| 6,814,105 B1 * | 11/2004 | Crim, Jr. ..................... 138/149 |
| 2001/0031329 A1 | 10/2001 | Shaffer ...................... 428/36.9 |
| 2001/0033926 A1 | 10/2001 | Matthews et al. ........ 428/316.6 |
| 2004/0079431 A1 * | 4/2004 | Kissell ....................... 138/149 |

* cited by examiner

*Primary Examiner*—Patrick Brinson
(74) *Attorney, Agent, or Firm*—Inger H. Eckert; Maria C. Gasaway (57) ABSTRACT

An insulated duct-wrap insulating product for an air duct that incorporates a wicking media to transport condensed water on the duct surface to be evaporated into the atmosphere. A wicking fabric, or fibrous media, incorporated as part of the insulating duct wrap is in contact with the metal air duct surface. A portion of the wicking fabric extends into the interior of the air duct, typically through joints in the duct system. When water vapor condenses on the air duct surface it is transported by the wicking fabric and evaporated from the wick surface within the air stream being transported by the ducting system.

14 Claims, 7 Drawing Sheets

DUCT INSULATION HAVING CONDENSATE WICKING

CROSS-REFERENCE TO RELATED APPLICATIONS

This application is a continuation-in-part of U.S. patent application Ser. No. 10/448,757, filed May 30, 2003 now U.S. Pat. No. 6,814,105, the contents of which are hereby incorporated by reference in its entirety.

TECHNICAL FIELD

This invention relates generally to a method and apparatus for insulating ducts for use in heating, ventilating, and air conditioning applications. More particularly, this invention pertains to an insulating process and apparatus involving duct insulation with condensate wicking having a pendently suspended wicking media located inside of the air duct.

BACKGROUND OF THE INVENTION

Generally, heating, ventilating, and air conditioning (HVAC) systems include such equipment as air handling units and air ducts. Typically, HVAC systems are provided with duct insulation for thermal and/or acoustic purposes. Conventional duct insulation used in HVAC systems typically includes a facing layer adhered to an insulation layer. The duct insulation is installed with the facing layer of the duct insulation positioned away from the air duct. During periods of high relative humidity, water vapor may condense on the air duct. The facing layer is typically non-porous such that the facing surface acts as a barrier between the insulation body and the external environment. As such, the duct insulation is not conducive to the escape or dissipation of the condensed water vapor on or within the insulation layer. Even when the duct insulation is unfaced the condensed water vapor may remain on the duct surface or trapped in the insulation layer. As a result, damage may be caused by the condensed water vapor to the air duct, the insulation layer, or the facing layer.

SUMMARY OF THE INVENTION

To solve the problems outlined above, the present invention provides an insulated duct-wrap insulating product for an air duct that incorporates a wicking media to transport condensed water on the duct surface to be evaporated into the atmosphere. A wicking fabric, or fibrous media, incorporated as part of the insulating duct wrap is in contact with the metal air duct surface. A portion of the wicking fabric extends into the interior of the air duct, typically through joints in the duct system. The extension of wicking fabric is conveniently inserted into the duct at the joints of the metal ducting system when the system is installed. When water vapor condenses on the air duct surface it is transported by the wicking fabric and evaporated from the wick surface within the air stream being transported by the ducting system.

The use of conditioned air within the ducting system for evaporating water that is transported from the surface of the duct is an efficient method for providing evaporation within the air stream without exiting or creating flaws in the vapor retarding jacket. The ducting system provides the shortest path for transporting condensed water from the wicking surface without breaking the continuous barrier to water vapor supplied by the insulation. The water vapor that is evaporated from the wicking fabric enters the air stream and is circulated within the living space or transported directed to the return air plenum where it can be removed by the condensing coil of the air-handling unit.

Various objects and advantages of this invention will become apparent to those skilled in the art from the following detailed description of the preferred embodiment, when read in light of the accompanying drawings.

DETAILED DESCRIPTION OF THE INVENTION

Figure 1:
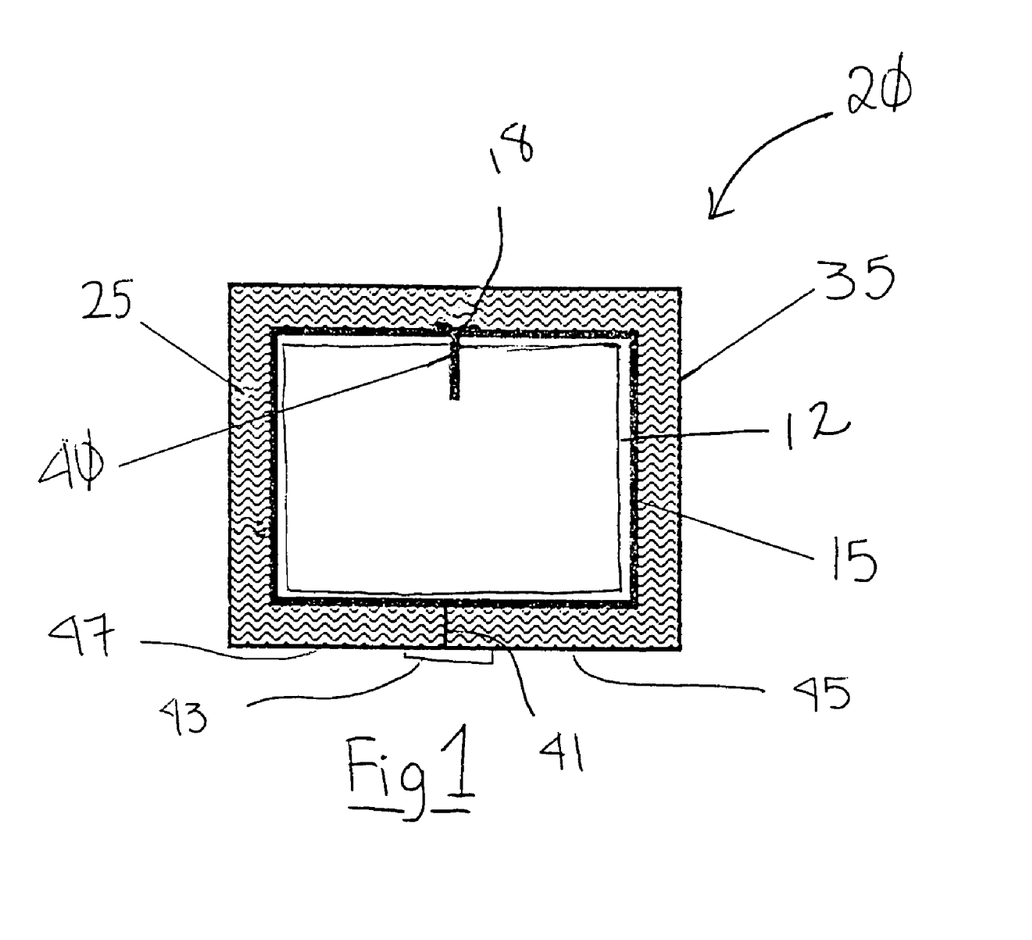
FIG. 1 is a schematic cross-sectional view of a portion of an insulated duct assembly in accordance with this invention.

As shown in FIG. 1, a laminated insulation blanket, indicated at 20, surrounds elongated duct 12. Elongated duct 12 is a typical sheet metal duct such as an air conditioning duct. However it will be appreciated that the elongated duct 12 may be any duct suitable for transporting air through a ventilation system. The laminated insulation blanket 20 has an insulation material layer 25 composed of compressible fiberglass insulation. While the insulation material layer 25 is described as being composed of compressible fiberglass insulation, it will be appreciated that the insulation material layer 25 can be composed of any suitable material for insulating the elongated duct 12. For example, other mineral fibers could be used including, but not limited to, elastomeric foam, foam glass, rock wool fibers, slag fibers, and basalt fibers, and organic fibers including but not limited to polypropylene, polyester and other polymeric fibers.

The laminated insulation blanket 20 has an inner wicking layer 15, which is at least partially in contact with the elongated duct 12, so that when water vapor condenses on the elongated duct 15, the condensed water vapor is drawn into the inner wicking layer 15. The inner wicking layer 15 has an affinity for liquids, and the layer transports liquid water away from the surface of the duct. Also, condensed water within the inner wicking layer will migrate from areas of higher concentration of water to areas of lower concentration, i.e., capillary action. Although the inner wicking layer 15 is shown as separate from the insulation material layer 25, it will be appreciated that the inner wicking layer 15 may be formed integrally within the insulation material layer 25.

Therefore, as an alternative to a laminated insulation blanket 20, a non-laminated insulation blanket having wicking material integrated into the interior side of the layer 15 may alternately be used as the insulation for the elongated duct 12. The inner wicking layer 15 is preferably composed of a non-woven wick material, such as, for example, a non-woven nylon fabric. It will be appreciated, however, that the inner wicking layer 15 may be composed of any material suitable for drawing and transporting the condensed water vapor such as a non-woven material that can be formed from a polymer or natural fiber such as rayon. Rayon fibers are striated, or include channels, along the length of the fiber, which provide capillary channels in individual fibers so the wick does not rely upon capillary action formed in the channel between two adjacent fibers. Rayon fibers are striated by their manufacture; it is possible to form striations in other polymers for example by forming trilobal fibers of any polymer material. Any polymer fiber exhibiting a striated structure would provide improved wicking properties.

Figure 6:
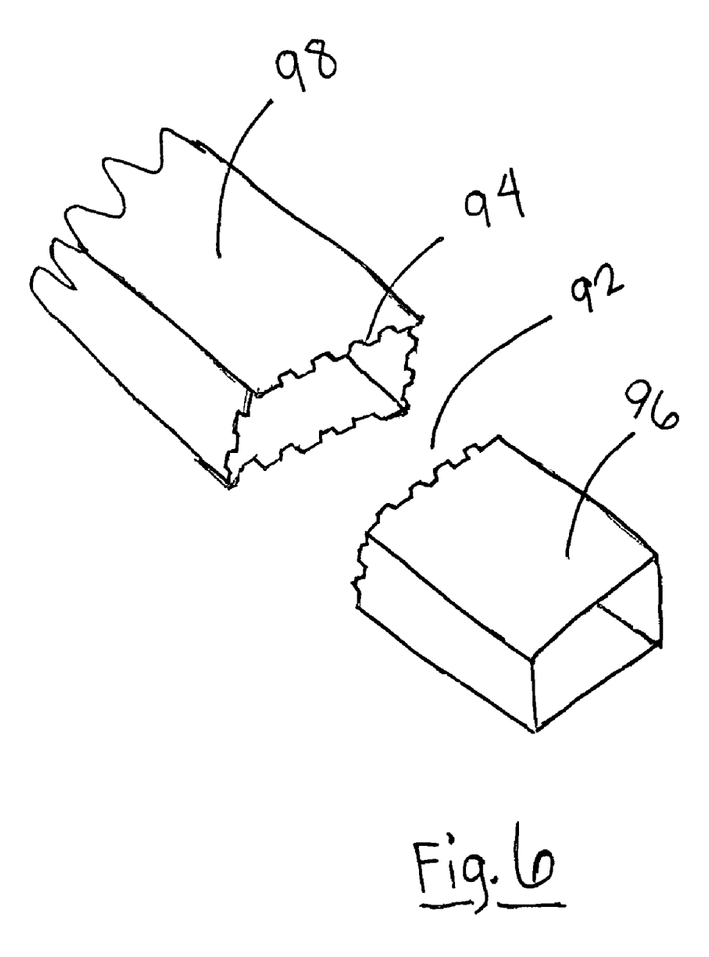
FIG. 6 is a schematic partially cut away view in perspective of an insulated duct assembly in accordance with this invention.
Figure 7:
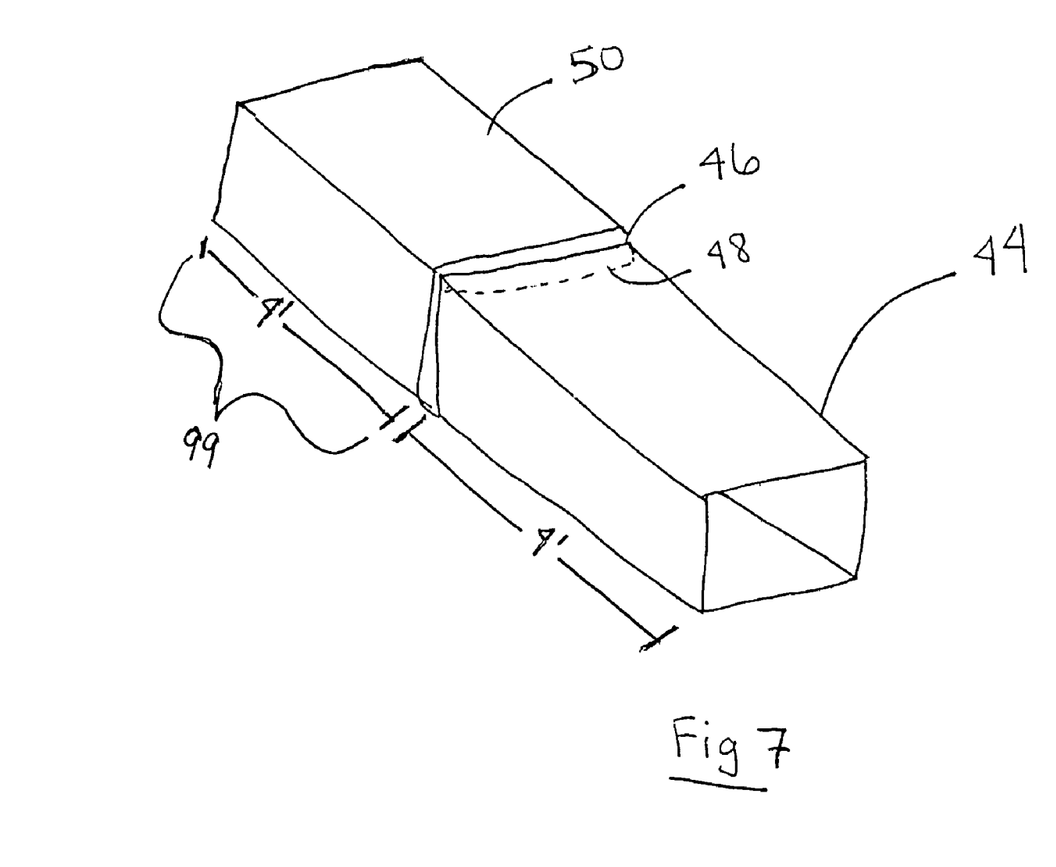
FIG. 7 is a schematic view in perspective of an insulated duct assembly in accordance with this invention.

A wicking layer section 40 of the wicking layer 15 extends into the interior of the air duct 12, typically through a joint 18 of the elongated duct 12. Although the joint 18 is depicted as being in the center of the elongated duct, the wicking layer 15 may extend through joints located in the corners, sides or bottom of the elongated duct. The joints may be zippered joints commonly known in the art. FIG. 6 depicts a first zippered joint 92 on a first air duct 96 and a second zippered joint 94 on a second air duct 98. As shown in FIG. 7, the inner wicking layer 15 may extend through said air duct in intervals of about four feet.

Although a rectangular air duct is shown, the duct may be any standard air duct of any shape, i.e., circular. Section 40 of the wicking layer 15 is inserted between the joints so that the wicking layer section 40 is inserted in the interior of the duct 12 so that it is in contact with the air stream (not shown) flowing through the air duct 12. FIG. 1 shows wicking layer section 40 as being suspended from the top of the duct. The wicking layer section 40 may, alternatively, be inserted in seams located in the corners, sides or bottom of the air duct 12. When water vapor condenses on the air duct surface it is transported by wicking layer 40 to the wicking layer section 40 and evaporated from wicking layer section 40 within the air stream flowing through the ducting system.

The insulation blankets described above may be any size and is fitted around conventional air ducts using standard installation practices. The insulation blankets of the present invention are typically installed around the air duct by wrapping the blanket around the air duct so that the insulation blanket is not excessively compressed at duct corners. The facing of the insulation blanket has an overlapping flange (typically 1 inch) which overlaps the adjacent wrapped section and is sealed with pressure-sensitive tape matching the facing (either plain foil or FRK backing stock) or glass fabric and mastic.

As shown in FIG. 1, the insulation blanket is installed by wrapping the insulation blanket 20 around the elongated duct 15. A portion of the inner wicking layer 40 is inserted into the air duct, i.e., typically through a joint. A first edge 45 of the insulation blanket 20 is secured to a second edge 47 of the insulation blanket by tape 43 or other adhesive means at seam 41.

Figure 3:
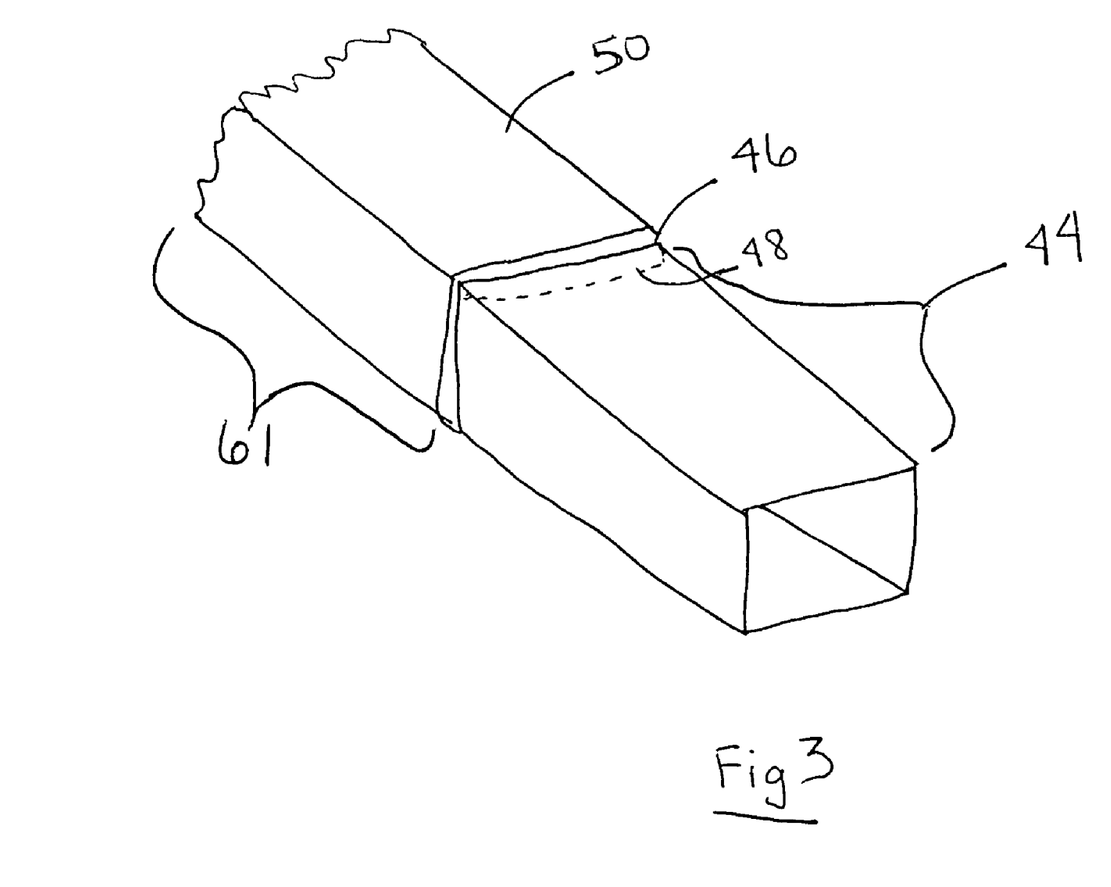
FIG. 3 is a schematic partially cut away view in perspective of an insulated duct assembly in accordance with this invention.

The wicking layer section may also be inserted into a joint between adjoining air ducts. FIG. 3 illustrates a first air duct 44 and second air duct 61 encased by insulation blanket 50. Wicking layer section 48 is inserted into the interior of the air duct viajoint 46. For illustration purposes, the insulation blanket does not encase air duct 44. As shown in FIG. 3, the wicking layer section 48 extends across the interior upper portion of the duct. Alternatively, the wicking layer section 48 may be inserted into the duct through the sides or through bottom of the duct (not shown).

Figure 2:
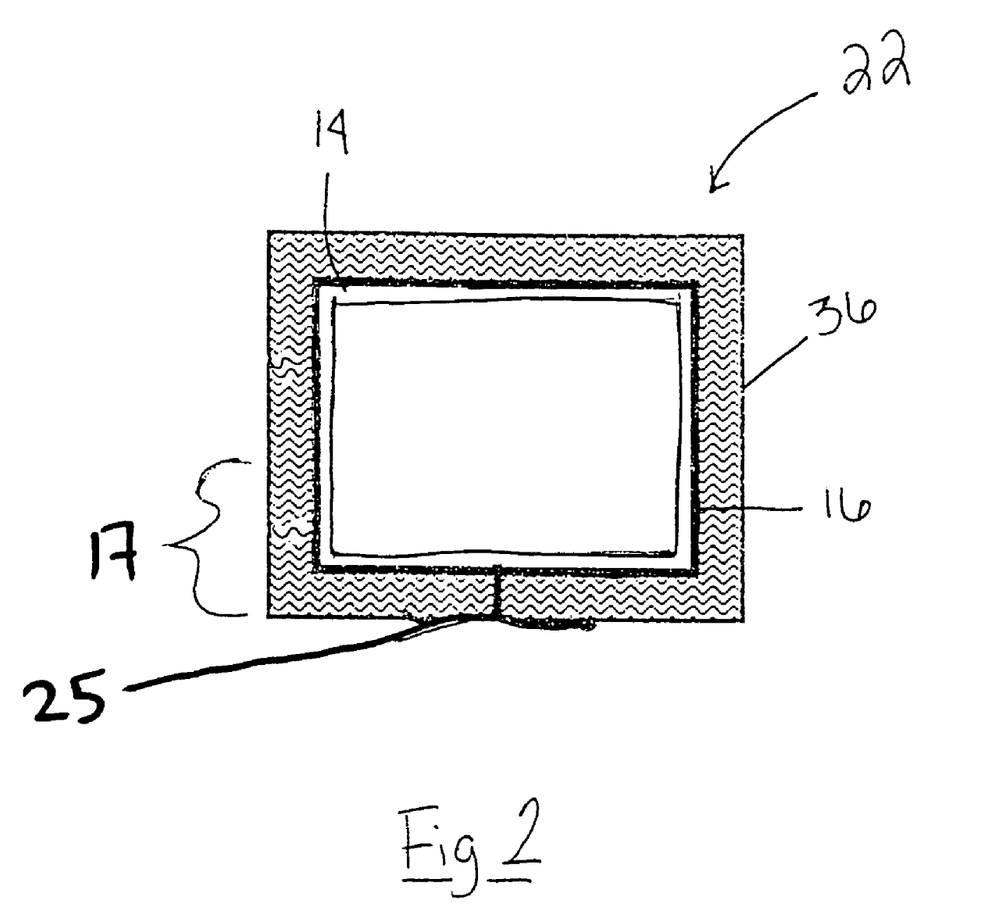
FIG. 2 is a schematic cross-sectional view of a portion of the insulated duct assembly in accordance with another embodiment of this invention.

As shown in FIG. 2, laminated insulation blanket, indicated at 22, surrounds elongated duct 14. In this embodiment of the present invention, an outer wicking portion 25 of said inner wicking layer extends through said insulation blanket 22 through a slit (not shown) to the exterior surface 36 of said insulation blanket at the bottom portion 17 of the insulation blanket 22. The outer wicking portion 25 is then affixed to the exterior surface 36 using a conventional adhesive or tape.

As above, the laminated insulation blanket 22 in FIG. 2, has an inner wicking layer 16, which is at least partially in contact with the elongated duct 16. When water vapor condenses on the elongated duct 14, the condensed water vapor is drawn into the inner wicking layer 16. When water (not shown) condenses on the elongated duct 14, gravity, in combination with capillary action, transports the water to the outer wicking portion 25 where the water is then evaporated.

Figure 4:
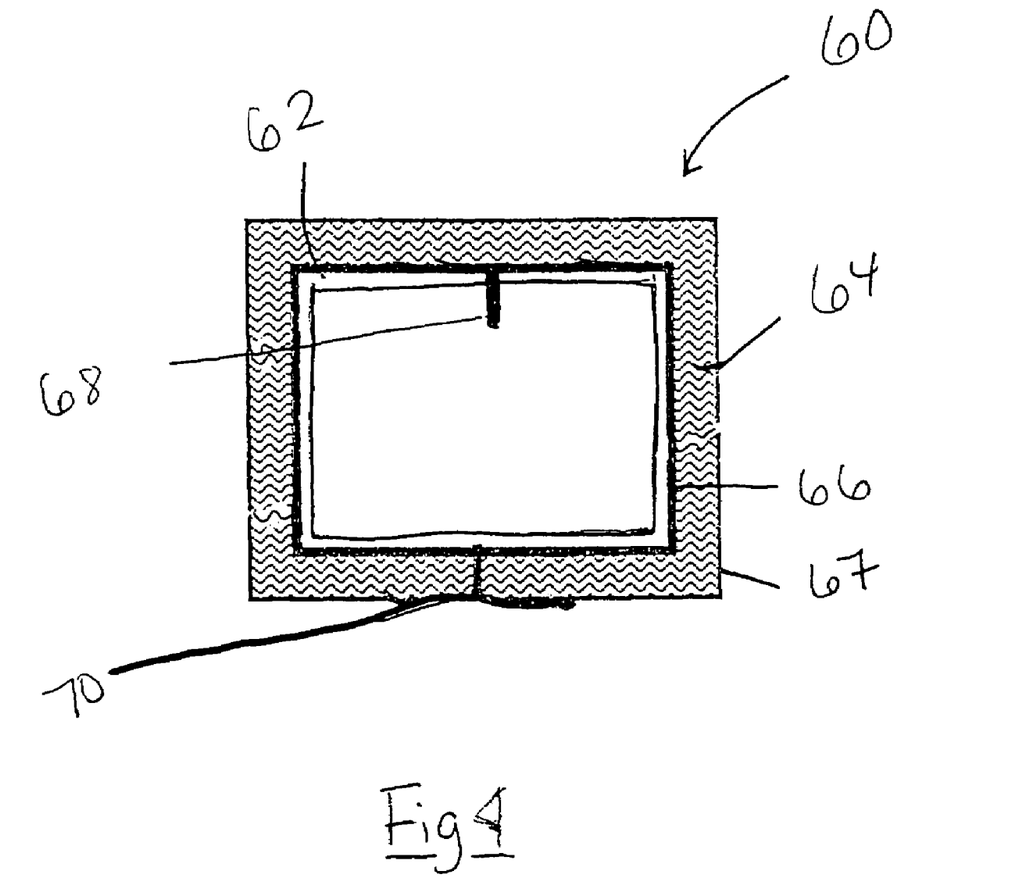
FIG. 4 is a schematic cross-sectional view of a portion of an insulated duct assembly combining the embodiments of FIGS. 1 and 2.

In an alternative embodiment as shown in FIG. 4, the wicking layer section located directly in the air stream is combined with the outer wicking portion, which extends to the outside air, to provide additional condensate wicking properties. FIG. 4 illustrates insulated duct assembly 60. Insulation blanket 64 having wicking layer 66 is wrapped around air duct 62. Wicking portion 68 extends through the air duct 62 into the air stream inside of the duct. A second wicking portion 70 extends through the insulation blanket 64 to the exterior surface of the insulation blanket and is affixed to the outer surface 67 of the insulation blanket by means of an adhesive or tape.

Figure 5:
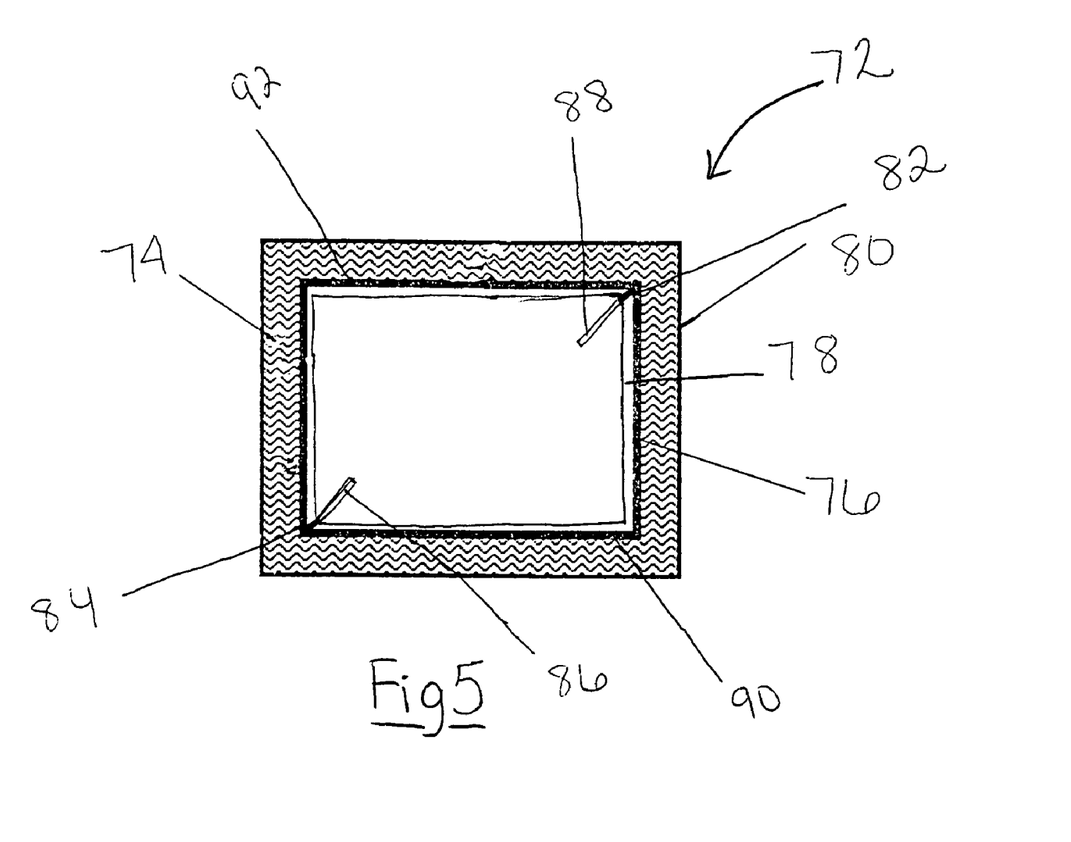
FIG. 5 is a schematic cross-sectional view of a portion of the insulated duct assembly in accordance with another embodiment of this invention.

FIG. 5 illustrates an alternative embodiment of the present invention. A laminated insulation blanket, indicated at 72, surrounds elongated duct 78. The laminated insulation blanket 72 is made of fibrous insulation material 74 and has an inner wicking layer 76, which is at least partially in contact with the elongated duct. Wicking layer sections 86, 88 of the wicking layer 76 extend into the interior of the air duct 78, through joints 82, 84 of the elongated duct 78. The joints 82, 84 join first duct section 90 with second duct section 92. It is standard practice in the art to assemble a convention air duct by joining two, "L-shaped" sections of the duct together in this manner via zippered joints. Although two inner wicking layer sections are shown, it may be desirable to have only one wicking layer section extend into the duct (not shown). In the alternative, more than two wicking layer sections may extend into the duct as well.

The insulation blankets described herein preferably, have an outer facing layer 35 (FIG. 1), 36 (FIG. 2), 67, (FIG. 5) 80, such as an outer Foil Reinforced Kraft (FRK) layer 35 or other facing layers which provide a vapor retarding layer. Such vapor retarding facing materials are typically made of polymeric or composite materials.

It will be appreciated, however, that the laminated insulation blanket may have any suitable outer facing layer, such as an outer foil layer or an outer kraft layer, or the laminated insulation blanket may be unfaced.

The principle and mode of operation of this invention have been described in its preferred embodiments. However, it should be noted that this invention may be practiced otherwise than as specifically illustrated and described without departing from its scope.

What is claimed is:

1. A method of forming an insulated duct assembly comprising:

wrapping a first elongated duct with an insulation blanket having first and second edges, the insulation blanket having an inner wicking layer which is in direct contact with said air duct surface;

inserting a portion of said inner wicking layer into the interior of said elongated duct; and adhering a tape layer to the outer surface of said insulation blanket near said first edge;

adhering a tape layer to the outer surface of said insulation blanket near the second edge of the insulation blanket; the tape layer being disposed along a seam of said insulation blanket.

2. The method of claim 1, wherein said portion of said inner wicking layer extends into the interior of said duct through a joint in a first section of said elongated air duct and a joint in a second section of said elongated air duct.

3. The method of claim 1, wherein said joints of said duct are zippered joints.

4. The method of claim 1, wherein said portion of said inner wicking layer extends into the interior of said duct through a joint in said elongated air duct and a joint in a second elongated air duct.

5. The method of claim 1, wherein said elongated duct extends longitudinally.

6. The method of claim 5, wherein said portion of said inner wicking layer extends into the interior of said duct longitudinally along said duct.

7. The method of claim 5, wherein said portion of said inner wicking layer extends into the interior of said duct perpendicular to the duct.

8. The method of claim 1, wherein said inner wicking layer extends through said air duct in intervals of about four feet.

9. The method of claim 1, wherein the insulation blanket further comprises an outer kraft layer.

10. The method of claim 1, wherein the insulation blanket further comprises an outer foil surface.

11. The method of claim 1, wherein the insulation blanket further comprises a facing material having vapor retarding properties.

12. The method of claim 11, wherein said facing material comprises a polymeric facing material.

13. The method of claim 11, wherein said facing material comprises a composite facing material.

14. The method of claim 1, wherein said duct is constructed of metal.

* * * * *